US012571659B2

(12) United States Patent
Oh

(10) Patent No.: US 12,571,659 B2
(45) Date of Patent: Mar. 10, 2026

(54) DEVICE AND METHOD FOR GENERATING ULTRASONIC SCAN IMAGE INFORMATION

(71) Applicant: PUKYONG NATIONAL UNIVERSITY INDUSTRY-UNIVERSITY COOPERATION FOUNDATION, Busan (KR)

(72) Inventor: Jung Hwan Oh, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 416 days.

(21) Appl. No.: 18/020,625

(22) PCT Filed: Nov. 23, 2021

(86) PCT No.: PCT/KR2021/017300
§ 371 (c)(1),
(2) Date: Dec. 6, 2023

(87) PCT Pub. No.: WO2022/114738
PCT Pub. Date: Jun. 2, 2022

(65) Prior Publication Data
US 2024/0102831 A1      Mar. 28, 2024

(30) Foreign Application Priority Data

Nov. 25, 2020    (KR) ........................ 10-2020-0159906

(51) Int. Cl.
*G01D 5/245* (2006.01)
*G01N 29/06* (2006.01)
*G01N 29/14* (2006.01)

(52) U.S. Cl.
CPC ....... *G01D 5/2451* (2013.01); *G01N 29/0672* (2013.01); *G01N 29/14* (2013.01)

(58) Field of Classification Search
CPC .... G01N 29/04; G01N 29/06; G01N 29/0672; G01N 29/14; G01N 29/22; G01D 5/12; G01D 5/244; G01D 5/245; G01D 5/2451
See application file for complete search history.

(56) References Cited

U.S. PATENT DOCUMENTS

| 8,087,298 B1 * | 1/2012 | DiMambro | .......... G01N 29/262 |
| | | | 73/644 |
| 2004/0082858 A1 * | 4/2004 | Fukuda | .................. A61B 8/445 |
| | | | 600/443 |

(Continued)

FOREIGN PATENT DOCUMENTS

| CN | 107907596 A | 4/2018 |
| JP | 1997-288097 A | 11/1997 |

(Continued)

*Primary Examiner* — Huy Q Phan
*Assistant Examiner* — David B Frederiksen
(74) *Attorney, Agent, or Firm* — Han's Law Office

(57) ABSTRACT

Disclosed are a device and a method for generating ultrasonic scan image information, which can convert a rotatory motion of a motor into a linear reciprocating motion of an ultrasonic probe to allow the ultrasonic probe to scan a subject at high speed, and rapidly generate an accurate three-dimensional ultrasonic image by using a trigger signal. The device for generating ultrasonic scan image information disclosed herein converts a unidirectional rotatory motion of a driving motor into a linear reciprocating motion of a ultrasonic probe connected to the driving motor and two-dimensionally scans a subject by the linear motion of the probe and a vertical motion perpendicular to the linear motion so as to generate an image of the subject. The device may comprise: an ultrasonic irradiation/reception unit for irradiating a subject with ultrasonic waves through a probe and receiving a reflection signal of the irradiated ultrasonic waves through the probe; a signal conversion unit for receiving the reflection signal and converting the reflection signal into a digital image signal; a main control unit for receiving the digital image signal and generating ultrasonic image information about the subject; and a trigger control unit for generating a trigger signal on the basis of motion (Continued)

information of the probe, wherein the ultrasonic image information is generated in synchronization with the trigger signal.

15 Claims, 5 Drawing Sheets

(56) References Cited

U.S. PATENT DOCUMENTS

| | | | |
|---|---|---|---|
| 2005/0213111 A1* | 9/2005 | Suzuki ................. | G01D 18/001 |
| | | | 356/617 |
| 2009/0126494 A1* | 5/2009 | Karasawa ............ | G01N 29/226 |
| | | | 73/620 |
| 2014/0024941 A1* | 1/2014 | Umeda ................... | A61B 8/54 |
| | | | 600/445 |
| 2017/0252010 A1* | 9/2017 | Matsunaga ............ | A61B 8/466 |
| 2019/0159758 A1* | 5/2019 | Hwang ................ | A61B 8/4405 |

FOREIGN PATENT DOCUMENTS

| | | | | | |
|---|---|---|---|---|---|
| JP | 2006-058029 | A | | 3/2006 | |
| KR | 10-0530452 | B1 | | 11/2005 | |
| KR | 10-2015-0080029 | A | | 7/2015 | |
| KR | 20150080029 | A | * | 7/2015 | ......... G01N 29/4463 |
| KR | 10-1694114 | B1 | | 1/2017 | |
| KR | 10-2017-0042519 | A | | 4/2017 | |
| KR | 102036058 | B1 | * | 10/2019 | .......... G01N 29/265 |
| KR | 10-2301420 | B1 | | 9/2021 | |

\* cited by examiner

[FIG. 1]
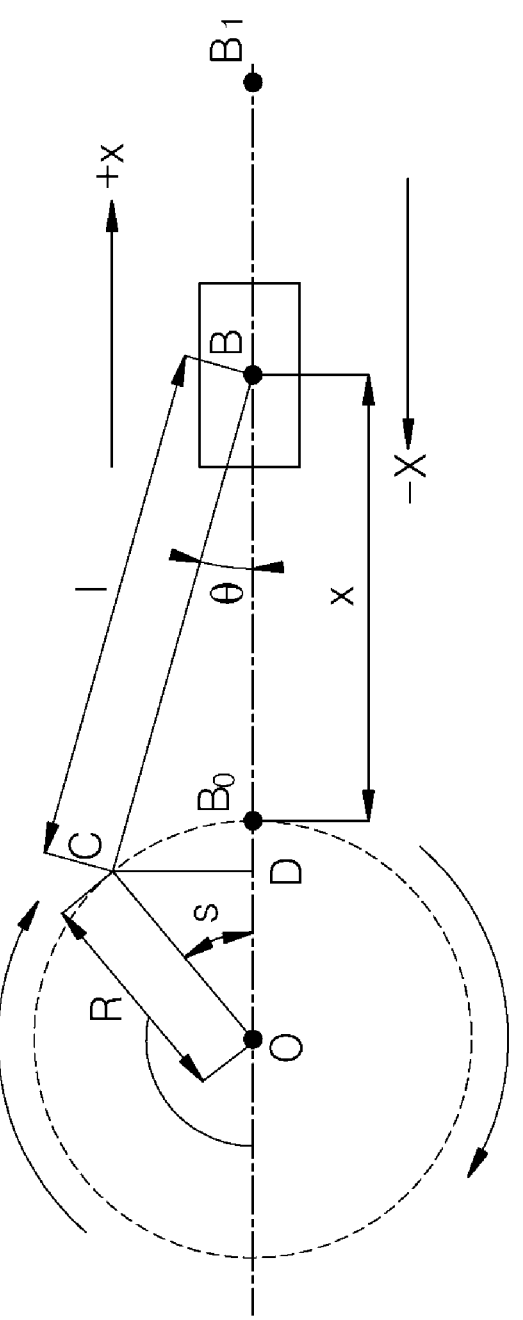

[FIG. 2]
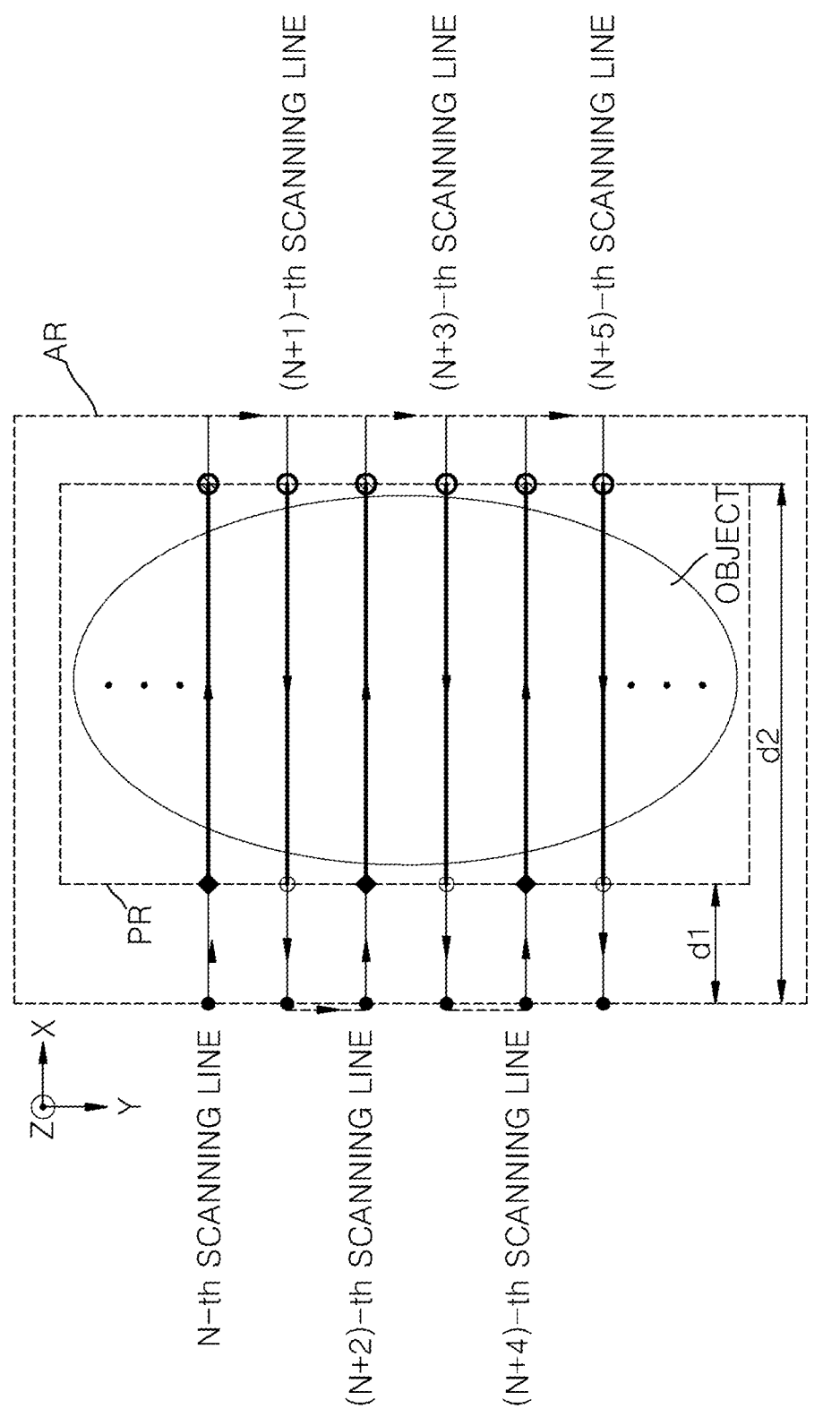

[FIG. 3]
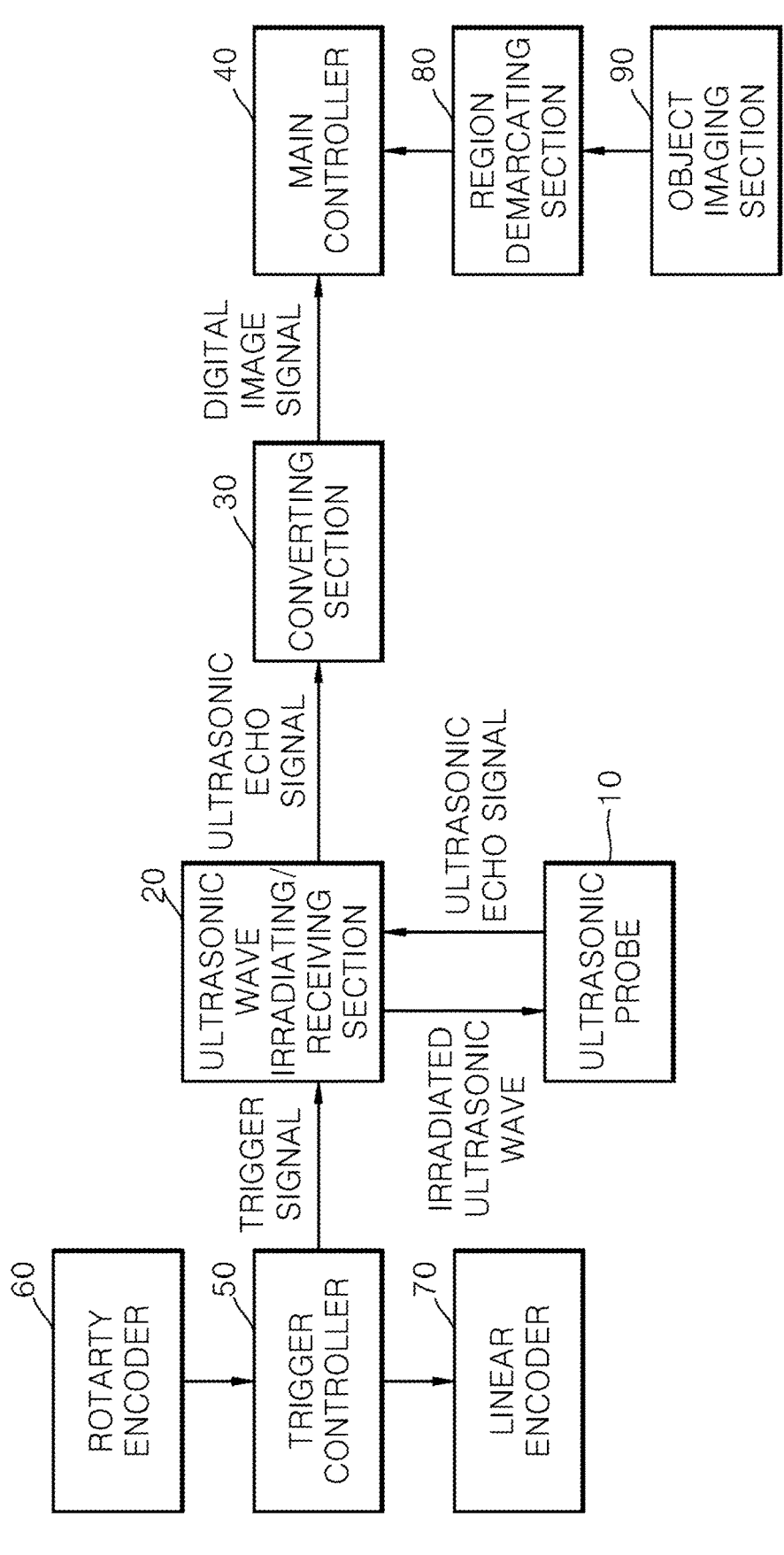

[FIG. 4]
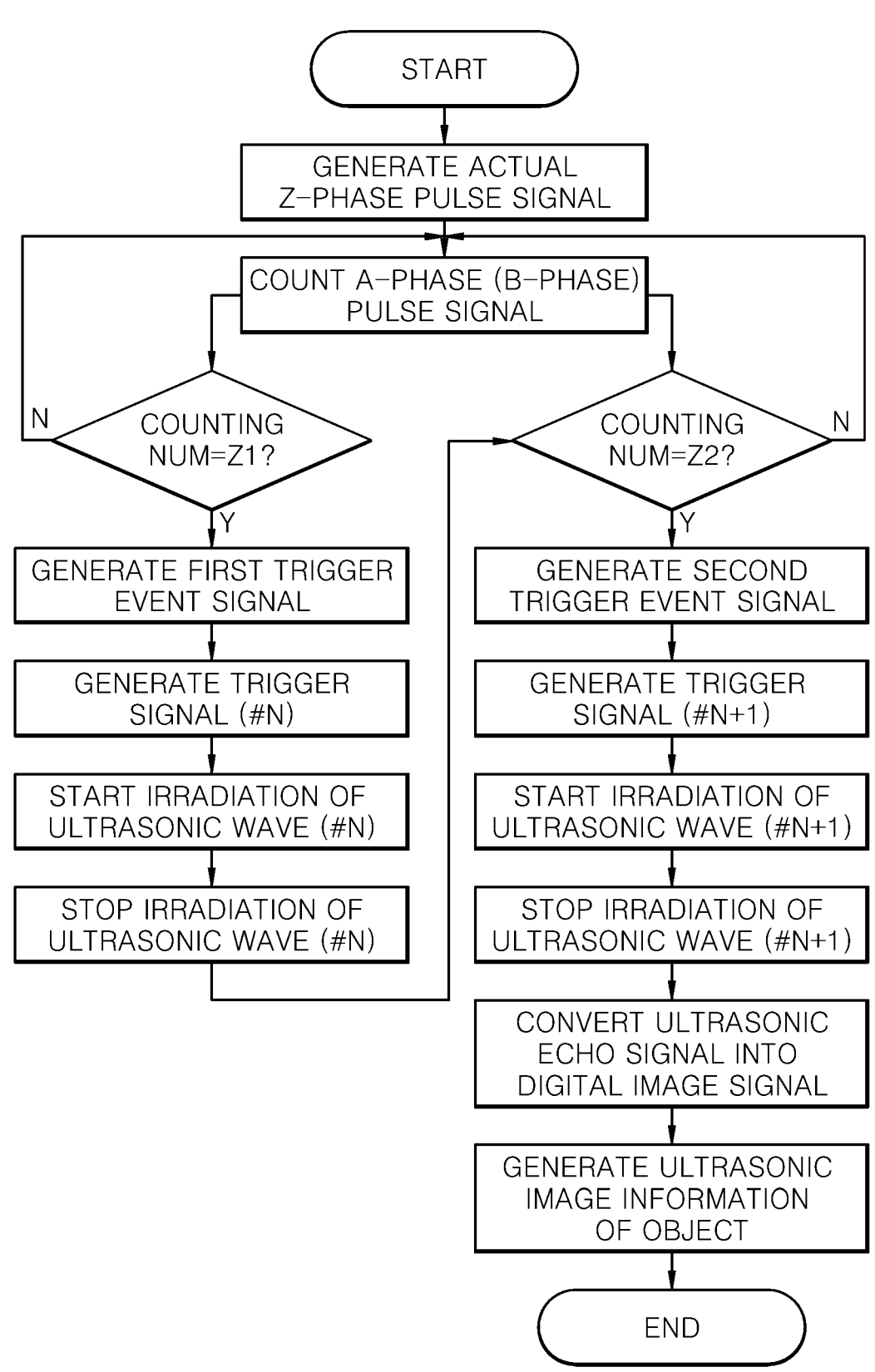

[FIG. 5]
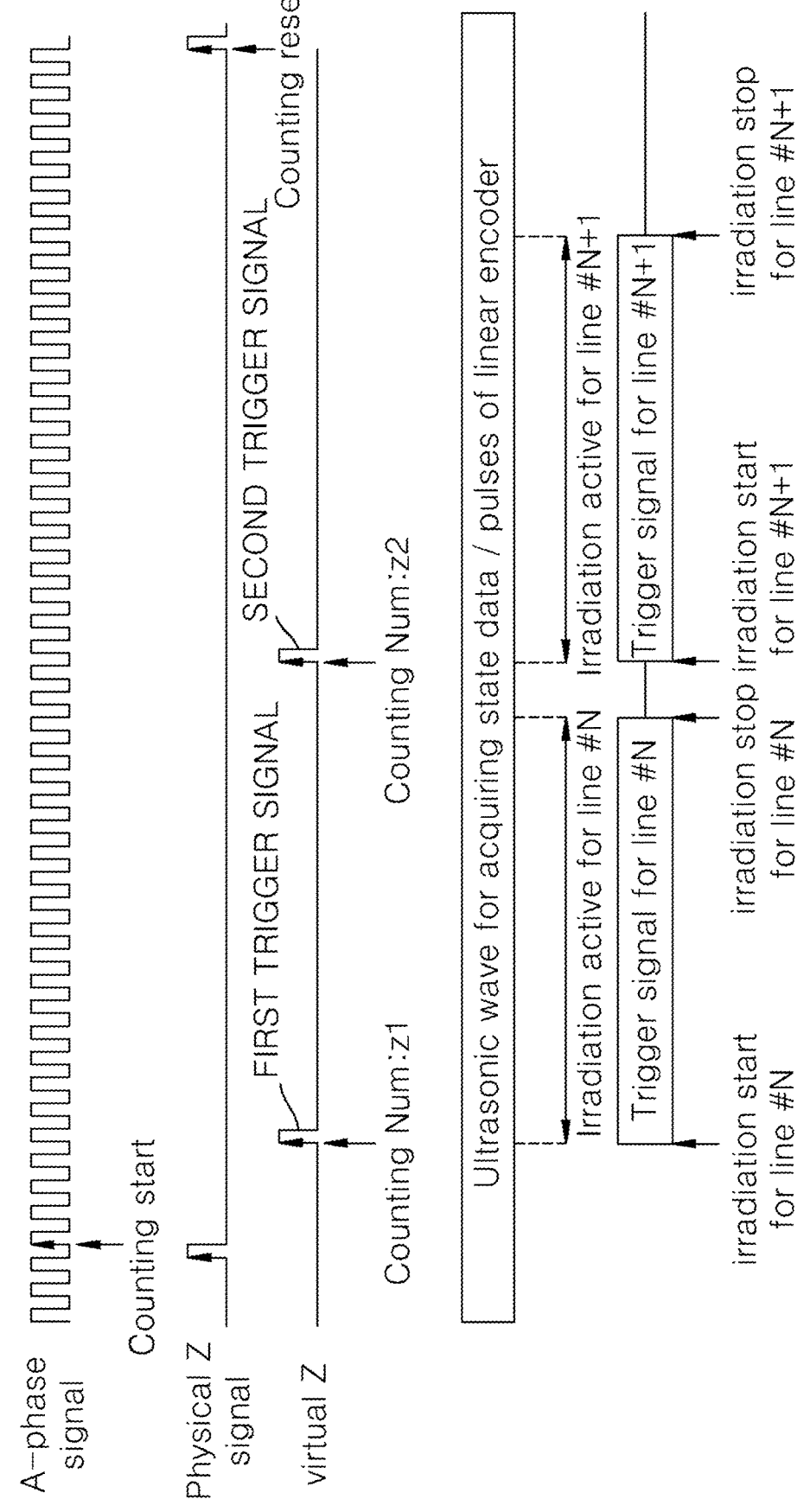

DEVICE AND METHOD FOR GENERATING ULTRASONIC SCAN IMAGE INFORMATION

TECHNICAL FIELD

The present invention relates to device and method for generating ultrasonic scan image information, and more particularly, to device for generating a 2D or 3D ultrasonic image of an object (subject to be examined) while moving an ultrasonic probe at high speed and a method therefor.

BACKGROUND ART

In general, an ultrasonic system is one of important diagnostic systems having various applications. In particular, the ultrasonic system has been widely used in various fields due to its non-invasive and non-destructive properties for an object. Recently, the ultrasonic system has been used to generate a 2D or 3D image of an internal shape of the object.

Such an ultrasonic system includes a probe including a broadband transducer for transmitting and receiving an ultrasonic signal. In a case where the transducer is electrically stimulated, an ultrasonic signal is generated, and the ultrasonic signal is transmitted to the object. The ultrasonic signal transmitted to the object is reflected from the object and is converted into an electrical signal by the transducer. The converted electrical signal is amplified and signal-processed to generate ultrasonic image data on the object.

On the other hand, in the related art, as an example of the ultrasonic system, an 'ultrasonic flaw detection device' has been proposed in Japanese Laid-Open Patent Publication No. 9-288097 (hereinafter referred to as a 'related art literature'). The ultrasonic testing device proposed in the related art literature is a technique for detecting a flow of an object while moving a testing probe along an X-axis, a Y-axis, and a Z axis.

In the ultrasonic flaw detection device proposed in the related art literature, the testing probe is moved in the X, Y, and Z axes by a ball screw and a belt driving mechanism. However, the ball screw and the belt driving mechanism have a limit in speeding up movement of the testing probe due to their structural characteristics. Due to the limit, there is a problem in that high-speed scanning of an object is not possible with the related art ultrasonic flaw detection device.

DETAILED DESCRIPTION OF THE INVENTION

Technical Problems to be Solved

An object of the present invention is to provide device for converting a rotational motion of a motor into a linear reciprocating motion of an ultrasonic probe so that the ultrasonic probe scans an object at high speed and generating ultrasonic scan image information capable of rapidly generating an accurate 3D ultrasonic image using a trigger signal, and a method therefor.

Technical Solution

According to an aspect of the present invention, there is provided device for generating ultrasonic scan image information, by converting a one-directional rotational motion of a drive motor into a linear reciprocating motion of an ultrasonic probe connected to the drive motor, and generating an image of an object by scanning the object in two dimensions by the linear motion of the probe and a vertical motion perpendicular to the linear motion, including: an ultrasonic wave irradiating/receiving section that performs irradiation of an ultrasonic wave to the object through the probe and receives an echo signal of the irradiated ultrasonic wave through the probe; a signal converting section that receives the echo signal and converts the received echo signal into a digital image signal; a main controller that receives the digital image signal and generates ultrasonic image information on the object; and a trigger controller that generates a trigger signal on the basis of motion information of the probe, in which the ultrasonic image information is generated in synchronization with the trigger signal.

A position of the probe may be calculated when each of the trigger signals is generated, and the echo signal at the calculated position may be stored in correspondence to each trigger signal.

The motion information of the ultrasonic probe may be rotational motion information of a rotary encoder that detects the rotational motion of the drive motor, and the rotary encoder may be an incremental rotary encoder that outputs an A-phase signal, a B-phase signal, and a Z-phase signal.

The trigger signal may be generated on the basis of rotational position information based on an A-phase signal of an incremental rotary encoder that detects the rotational motion of the drive motor, a linear motion position of the probe when each trigger signal is generated may be calculated, and the echo signal at the calculated linear motion position may be stored in correspondence to each trigger signal.

The rotational position information may be calculated as a rotation angle ($\varphi$) according to the number of pulses of the A-phase signal based on a Z-phase signal of the rotary encoder, and the linear motion position (x) of the probe may be calculated by the following equation, $$x = R * \cos(\emptyset) + L * \left[1 - \frac{(R/L)^2}{4} + \frac{(R/L)^2}{4} * \cos(2\emptyset)\right] - R$$

where R is a length of a crank shaft connected to the motor, and L is a length of a connecting rod connecting the crank shaft and the probe.

The trigger signal may be generated on the basis of a linear motion position of the probe calculated by a pulse signal generated by a linear encoder that detects the linear motion of the probe, and the echo signal at the linear motion position of the probe may be stored in correspondence to each trigger signal.

The motion information of the probe may include rotational motion information of a rotary encoder that detects the rotational motion of the drive motor and linear motion information of a linear encoder that detects the linear motion of the probe, the rotary encoder may be an incremental rotary encoder that outputs an A-phase signal, a B-phase signal, and a Z-phase signal in the form of pulses, respectively, and the linear encoder may output a linear pulse signal at regular intervals in the form of pulses according to a position on a linear motion trajectory of the probe.

The one-directional rotational motion of the drive motor may be started, a first trigger event signal may be generated after generation of the Z-phase signal of the rotary encoder, and in a case where the first trigger event signal is generated, the trigger signal may be generated in the form of pulses up to a preset position of the probe using the pulse signal of the linear encoder as a synchronization signal.

The first trigger event signal may be generated after the A-phase signal of a preset number of pulses (Z1) is input after the Z-phase signal of the rotary encoder is input.

The trigger signal may be generated at an interval of an integer multiple of an interval of the pulse signal of the linear encoder.

The trigger controller may generate a second trigger event signal in correspondence to a preset position of the probe after the generation of the trigger signal is stopped, and in a case where the second trigger event signal is generated, the trigger signal may be generated in the form of pulses up to the preset position of the probe using the pulse signal of the linear encoder as a synchronization signal.

The second trigger event signal may be generated after the A-phase signal of a preset number of pulses (Z2) is input after the Z-phase signal of the rotary encoder is input.

The device for generating ultrasonic scan image information may include: an object imaging section that images the object; and a region demarcating section that extracts position values corresponding to a starting point and an end point of a region where state information of the object is acquired from an image of the object to demarcate a region where the state information is acquired.

According to another embodiment of the present invention, there is provided a method for generating ultrasonic image information on an object by scanning of an object in two dimensions by a linear motion of an ultrasonic probe and a vertical motion perpendicular to the linear motion, including: generating a trigger signal for the irradiation of the ultrasonic wave on the basis of the motion information of the probe; performing irradiation of an ultrasonic wave to the object through the probe and receiving an echo signal of the irradiated ultrasonic wave through the probe; converting the echo signal into a digital image signal; generating ultrasonic image information on the object from the digital image signal; and generating a trigger signal for the irradiation of the ultrasonic wave on the basis of the motion information of the probe, in which the irradiation of the ultrasonic wave is performed using the trigger signal as a synchronization signal.

The trigger signal may be generated in correspondence to the motion information of the probe, a position of the probe may be calculated when each trigger signal is generated, and the echo signal at the calculated position may be stored in correspondence to each trigger signal.

The trigger signal may be generated in correspondence to rotational position information based on an A-phase signal of an incremental rotary encoder that detects the rotational motion of a drive motor, a linear motion position of the probe when each trigger signal is generated may be calculated, and the echo signal at the calculated linear motion position may be stored in correspondence to each trigger signal.

The trigger signal may be generated on the basis of a linear motion position of the probe calculated by a pulse signal generated by a linear encoder that detects the linear motion of the probe, and the echo signal at the linear motion position of the probe may be stored in correspondence to each trigger signal.

The motion information of the probe may include rotational motion information of a rotary encoder that detects the rotational motion of the drive motor and linear motion information of a linear encoder that detects the linear motion of the probe, the rotary encoder may be an incremental rotary encoder that outputs an A-phase signal, a B-phase signal, and a Z-phase signal in the form of pulses, respectively, and the linear encoder may output a linear pulse signal at regular intervals in the form of pulses according to a position on a linear motion trajectory of the probe.

The one-directional rotational motion of the drive motor may be started, a first trigger event signal may be generated after generation of the Z-phase signal of the rotary encoder, and in a case where the first trigger event signal is generated, the trigger signal may be generated in the form of pulses up to a preset position of the probe using the pulse signal of the linear encoder as a synchronization signal.

A second trigger event signal may be generated in correspondence to a preset position of the probe after the generation of the trigger signal is stopped, and in a case where the second trigger event signal is generated, the trigger signal may be generated in the form of pulses up to the preset position of the probe using the pulse signal of the linear encoder as a synchronization signal.

Advantageous Effects

According to the present invention, it is possible to quickly generate an accurate 3D ultrasonic image by converting a rotational motion of a motor into a linear motion of an ultrasonic probe to scan an object at high speed.

BRIEF DESCRIPTION OF DRAWINGS

FIG. 1 is a diagram schematically showing a slider-crank mechanism.

FIG. 2 is a diagram for illustrating a process of scanning an object according to the slider-crank mechanism.

FIG. 3 is a diagram showing a preferred configuration of device according to the present invention.

FIG. 4 is a diagram showing a preferred flow of a method according to the present invention.

FIG. 5 is a timing diagram showing an event signal, a trigger signal, and a related signal generated according to the present invention.

EMBODIMENTS FOR CARRYING OUT THE INVENTION

Prior to specific description of the present invention, a point of a technical concept of the present invention or an outline of a solution to the problem to be solved is first presented for convenience of understanding.

In this specification, an 'object' is used as a term to mean an object of an inspection, particularly a visual inspection, and its type is very diverse in various industrial fields, and the types and aspects of the inspection are also very diverse in various industrial fields.

According to the device for generating ultrasonic scan image information according to the present invention, in a case where a rotational motion of a drive motor is converted into a linear reciprocating motion of a probe connected to the motor and an object is scanned in two dimensions by the linear reciprocating motion of the probe and a motion perpendicular to the linear reciprocating motion to obtain ultrasonic image information, a problem that arises when an actual (or physical) Z-phase pulse signal of a rotary encoder that provides motion information of the motor is not stably implemented is corrected by introducing a virtual Z-phase pulse signal, and thus, it is possible to secure the accuracy (reliability) of generated image information related to the object. In other words, since 'start of a scanning operation' by the actual Z-phase pulse signal and 'start of ultrasonic irradiation for acquisition of state information' by the virtual Z-phase pulse signal are performed with a time difference, it is possible to obtain accurate image information from which noise or the like is eliminated.

A plurality of methods has already been proposed or are being industrially used as a method for generating image information related to an object. For example, there are a number of methods, such as a method of generating an ultrasonic image for medical use, a method of generating an image related to an object for inspecting the degree of damage of the object, or the like.

Among these various methods, there is a method of generating image information related to an object through a scanning process for the object. The present invention uses a drive motor and a scanning probe connected to the motor as a method of generating image information using such scanning. In this case, there is a basic mechanism for operations of the motor and the scanning probe, which will be referred to as a 'slider-crank mechanism'.

FIG. 1 is a diagram schematically showing a slider-crank mechanism.

The slider-crank mechanism is a mechanism that converts a rotational motion of a motor into a linear translational motion of a probe connected to the motor. In FIG. 1, a central point O denotes a fixed link, and a point B denotes a slider link. In terms of a mechanical configuration, the fixed link corresponds to a drive motor that performs a rotational motion, and the slider link corresponds to a scanning probe that performs a linear reciprocating motion. In FIG. 1, OC refers to a crank link, and CB refers to a coupler link. In terms of a mechanical configuration, the crank link corresponds to a crank shaft, and the coupler link corresponds to a connecting rod.

One end of the crank shaft is coupled to a shaft of the motor, and the other end is coupled to one end of the connecting rod in a similar manner to a hinge coupling, and the other end of the connecting rod is coupled to the probe in a similar manner to the hinge coupling. In a case where the motor rotates, the crank shaft rotates in the same direction as a rotation direction of the motor, and this rotation drives one end of the connecting rod, and this driving force is transmitted to the other end of the connecting rod in a longitudinal direction of the connecting rod to induce the linear reciprocating motion (movement in +X direction and −X direction) of the probe. This mechanism is similar to a motion mechanism of a crank shaft and a piston applied to a four-stroke engine, which is a kind of internal combustion engine. Further, in order to ensure stability of the linear reciprocating motion, a linear guide is usually provided on the slider link (probe side).

On the other hand, on the motor side and the probe side, there are provided encoders that measure physical quantities related to each motion, such as a current position, a motion speed, a rotation speed, and a rotation angle. Since the motor performs the rotation motion, a rotary encoder is provided on the motor side for easy measurement of physical quantities (rotational motion speed, rotation angle, or the like) related to the rotational motion, and since the probe performs the linear translational motion, a linear encoder is provided on the probe side for easy measurement of physical quantities (translational motion speed, translational motion distance, probe position, or the like) related to the linear motion. These encoders provide the measured physical quantities in the form of an electrical signal to a controller that controls the operations of the motor or probe, and the controller controls the operations on the basis of the received physical quantities. Here, the 'motor side (probe side)' is an expression to cover a case where the encoder is built in the motor (probe) and a case where it is not, which includes a case where the encoder is actually built in the motor (probe) and a case where the encoder is provided outside thereof.

A process of scanning an object using the slider-crank mechanism will be briefly described with reference to FIG. 2. Scanning of an N-th line (line #N) of the object is performed in one direction (X-direction) of the translational motion of the probe. In a case where the scanning of the N-th line is finished, the probe is moved in the Y-direction, and then, an (N+1)-th line (line #N+1) is scanned in the reverse direction (−X direction) of the translational motion. That is, alternating scanning is performed on a line-by-line basis, and thus, a so-called zigzag two-dimensional scanning is performed.

On the other hand, the encoder is roughly classified into an incremental encoder and an absolute encoder according to a method of measuring the above-described physical quantities. Details of the two encoders will not be described since they are already known in the art. However, they will be briefly mentioned in relation to an implementation method of the present invention to be described later.

The incremental encoder and the absolute encoder have different slit shapes. In the former, each slit has a uniform shape, whereas in the latter, each slit has a different and unique shape. This difference in the shape of the slit results in a difference of necessity of a reference point (origin) in measurement of the above-mentioned physical quantities. That is, in the former case, the reference point is required, whereas in the latter, the reference point is not required. In the former case, in a case where a certain problematic situation (unpredictable cut-off of power, unpredictable interruption of motion, or the like) occurs, all information about physical quantities provided to a motion controller of a motor or a probe is lost (returns to the reference point), it is necessary to perform the measurement of all physical quantities again from the beginning, which becomes a disadvantage. On the other hand, since the latter case does not require the reference point, there is no such concern even in a case where a problematic situation occurs, unlike the former case. In a case where the problematic situation is solved, it is possible to restart measurement of all physical quantities immediately after the problematic situation occurs. That is, the continuity of the measurement of all physical quantities can be ensured.

However, in the latter case, it takes a very long time to manufacture the slit due to the above-described characteristic of the slit shape, and the design of a related motor operation control mechanism becomes very complicated or difficult, so that it takes a lot of effort and time to implement the control mechanism. This eventually causes an increase in cost required to obtain a final result such as a product, and since the cost is significantly higher than the case of using the former under the same conditions, the former case is used much more than the latter case in spite of the above-mentioned disadvantages in most industrial fields.

However, in the former case, it is difficult to utilize the encoder due to the above-mentioned disadvantages in fields where precise or continuous control of the operations of the motor and the device (probe) is necessary. Since it is not easy to secure stability (stable implementation) of the reference point due to several reasons, there is a problem in reliability of generated information (information to be obtained) about the object. That is, there is a problem that the accuracy of the generated information may be lacking. A so-called Z-phase pulse signal is generated from the former reference point, which is a signal generated every time the motor rotates. The signal serves as a reference signal (reference point) for measurement of the above-described physical quantities. However, as mentioned above, since it is not easy to stably implement the reference point, it causes incompleteness in the operation control of the motor and the device (probe), and thus, a possibility of lack of accuracy of the generated information exists.

Accordingly, the point of the technical concept of the present invention is to solve a problem that may occur due to the failure of stable implementation of the reference point in acquiring image information related to an object by using the slider-crank mechanism through predetermined signal processing to secure the accuracy (reliability) of generated image information related to the object.

Hereinafter, the specific content of the present invention will be described in detail with reference to the accompanying drawings on the basis of preferred embodiments of the present invention. In the drawings, the same reference numbers are given to the same components. In addition, in a case where it is determined that a known function or configuration related to the present invention is not significantly related to the point of the present invention, a detailed description thereof will be simplified or omitted.

Further, terms used in the present specification have been used as widely used general terms as possible in consideration of functions or configurations in the present invention, which may vary depending on an intention of a person skilled in the art, precedents, emergence of new technologies, or the like. In addition, in certain cases, there are also terms arbitrarily selected by the inventors, and in this case, the meaning thereof will be described in detail in corresponding description of the invention. Therefore, the terms used in this specification should be defined on the basis of the meanings of the terms and the overall content of the present invention.

In the present specification, in a case where a certain section Includes' a certain component, it means that other components may be further included, unless otherwise stated. Further, the term 'section' as used herein means not only a hardware configuration such as an FPGA or an ASIC, but also a software configuration. Further, the 'section' is not limited to software or hardware. The 'section' may be provided on an addressable storage medium, or may be configured to reproduce one or more processors. Accordingly, as examples, the 'section' may include components such as software components, object-oriented software components, class components and task components, and may include processes, functions, properties, procedures, subroutines, segments of program codes, drivers, firmware, microcodes, circuitry, data, databases, data structures, tables, arrays and variables. Functions provided within the components and 'sections' may be combined into a smaller number of components and 'sections' or may be further divided into additional components and 'sections'.

FIG. 3 is a diagram showing a preferred configuration of device according to the present invention, FIG. 4 is a diagram showing a preferred flow of a method according to the present invention, and FIG. 5 is a timing diagram showing a trigger signal, a related signal, and a variety of data generated according to the present invention.

First, in the present invention, the incremental encoder is used due to the above-mentioned disadvantages of the absolute encoder. It has already been mentioned that it is not easy to secure stability (stable implementation) of the reference point when using the incremental encoder, and detailed description thereof will be made hereinafter.

In a manufacturing process of an incremental rotary encoder, in forming a slit (reference point) from which a Z-phase pulse signal is generated and output, the slit may be formed at a non-intended position due to a problem in the process, or deformation occurs in the slit due to a problem in storage of the rotary encoder or the influence of temperature and humidity, so that the position of the already formed slit may become incorrect. In a case where the position of the slit becomes incorrect as described above, it is difficult to accurately detect a rotation angle or the number of rotations of a motor. That is, in a case where the position of the slit provided to represent a specific rotation angle becomes incorrect, the rotation angle actually indicated by the slit will be different from an intended specific angle. Here, since the rotary encoder recognizes that the rotation angle is equal to the intended specific rotation angle for the specific slit, a difference between the actual angle of the specific slit and a predicted angle thereof occurs. Due to the difference, a problem occurs in that the measurement result of the rotation angle or the number of rotations of the motor is not reliable. Further, the generation of the Z-phase pulse signal may be unstable even due to mechanical vibrations that may occur during the movement of the motor and the probe.

The above-mentioned problem causes inaccuracies in image information generated by using the slider-crank mechanism. That is, since the reference point becomes unstable, the reference signal for motion controls of the motor and the device (probe) becomes unstable, which causes distortion of image signals, and distortion of generated image information such as noise. The present invention introduces a virtual Z-phase pulse signal (virtual Z) as a method for solving the above-mentioned problems to ensure the accuracy of generated image information.

A trigger controller 50 generates a trigger signal for ultrasonic irradiation on the basis of motion information of an ultrasonic probe 10, and outputs the trigger signal to an ultrasonic wave irradiating/receiving section 20. In this case, the trigger controller 50 generates the trigger signal on the basis of rotational position information by an A-phase signal of an incremental rotary encoder that detects a rotational motion of a drive motor, and calculates a linear motion position of the probe when each trigger signal is generated.

On the other hand, it is preferable that the rotational position information is calculated as a rotation angle ($\varphi$) according to the number of pulses of the A-phase signal based on a Z-phase signal of the rotary encoder, and a linear motion position (x) of the probe is calculated by the following equation.

$$x = R * \cos(\emptyset) + L * \left[ 1 - \frac{(R/L)^2}{4} + \frac{(R/L)^2}{4} * \cos(2\emptyset) \right] - R$$

Here, R is the length of the crank shaft connected to the motor (length of O-C in FIG. 1), and L is the length of the connecting rod that connects the crank shaft and the probe (length of C-B in FIG. 1).

On the other hand, the trigger controller 50 may generate the trigger signal on the basis of the linear motion position of the probe 10 calculated by a pulse signal generated by the linear encoder that detects the linear motion of the probe 10. That is, the trigger signal may be generated only on the basis of the linear motion position of the probe 10 grasped by the pulse signal generated by the linear encoder without the rotary encoder.

Further, the trigger controller 50 may generate a trigger signal by simultaneously using the rotational motion information of the rotary encoder that detects the rotational motion of the drive motor and the linear motion information of the linear encoder that detects the linear motion of the probe. In this case, the rotary encoder is an incremental rotary encoder that outputs an A-phase signal, a B-phase signal, and a Z-phase signal in the form of pulses, respectively, and the linear encoder outputs a linear pulse signal at regular intervals in the form of pulses according to the position on the linear motion trajectory of the probe 10.

The generation of the trigger signal in the trigger controller 50 will be described in terms of generation timing.

In a case where a one-directional rotational motion of the drive motor is started, a first trigger event signal is generated to obtain state information of an object corresponding to an N-th scanning line after generation of a Z-phase signal of the rotary encoder. In a case where the first trigger event signal is generated, the trigger signal is generated in the form of pulses up to a preset position of the probe using the pulse signal of the linear encoder as a synchronization signal (Thus, ultrasonic waves are irradiated to the object). Specifically, the first trigger event signal is generated after an A-phase signal of a preset number of pulses is input after the Z-phase signal of the rotary encoder is generated.

Here, it is preferable that the trigger signal is generated at an interval of an integer multiple of an interval of the pulse signal of the linear encoder. Thus, the interval of the trigger signal may be determined according to a resolution set from the outside, and thus, it is possible to reduce load on generation and processing of an ultrasonic signal by enabling a smaller output of an ultrasonic wave irradiation signal and a smaller input of an ultrasonic echo signal. Further, by evaluating image quality of an image signal generated in real time to adaptively adjust the trigger signal generation interval, it is possible to obtain an image of optimal quality while reducing the load on generation and processing of the ultrasonic echo signal.

In this regard, it is most desirable to constantly make the wavelength (interval) of the trigger signal the same as the interval of the pulse signal of the linear encoder (because it is possible to obtain as much information as possible on the state of the object, it is possible to generate higher resolution image information). However, in this case, there is a concern that excessive time is necessary for processing of the acquired state information and the load of the image information generation process for the object is increased. This may cause inaccuracy of the generated image information (because an error may occur in various processing processes for image information generation according to the increase in load), which may rather lower the significance of the present invention. Accordingly, it is necessary to properly set the amount of acquisition of necessary state information in consideration of various factors such as the type and state of the object, which depends on a wavelength of the generated trigger signal (an output step of the trigger signal). For example, in a case where the interval (resolution) of the pulse signal of the linear encoder is 20 [μm], the trigger controller 50 sets the interval of a trigger signal to be generated to 40 [μm], 60 [μm], 80 [μm], and so on to generate the trigger signal. In a case where the trigger signal is generated, an ultrasonic wave for acquiring state information of the object by the ultrasonic wave irradiating/receiving section 20 is irradiated to the object through the probe 10 using the trigger signal as a synchronizing signal.

On the other hand, after the first trigger event signal is generated and the trigger signal is generated in the form of pulses up to the preset position of the probe using the pulse signal of the linear encoder as a synchronization signal, the generation of the trigger signal is stopped (accordingly, the irradiation of the ultrasonic wave is stopped, and the acquisition of the state information of the object corresponding to the N-th scanning line is terminated), a second trigger event signal is generated in correspondence to a preset position of the probe to acquire the state information of the object corresponding to the (N+1)-th scanning line. In a case where the second trigger event signal is generated, the trigger signal is generated in the form of pulses up to the preset position of the probe using the pulse signal of the linear encoder as a synchronization signal.

In the above description, the first trigger event signal and the second trigger event signal correspond to the virtual Z-phase pulse signal (virtual Z), and the acquisition of state information is not started by the generation of the actual Z-phase pulse signal (physical Z), but is started by the generation of these two event signals. In other words, in the present invention, only a notification role of the 'starting of scanning operation' is given to the actual Z-phase pulse signal, and a notification role of the 'starting of state information acquisition' is given to these two event signals. Here, since the term 'virtual' means that two event signals perform some of the roles to be performed by the actual Z-phase pulse signal as described above, and thus, function "like" the actual Z-phase pulse signal.

In a case where the 'starting of scanning operation' and the 'starting of state information acquisition' are simultaneously (without time difference) performed by the generation of the actual Z-phase pulse signal, as described above, since stable implementation of the actual Z-phase pulse signal is not guaranteed, the acquisition of the state information inevitably causes instability or inaccuracy. Thus, it can be said that these two event signals function to correct such a problem. By the generation of these two event signals, the state information is acquired only for a partial section (a thick line in FIG. 2) rather than the entire section of each scanning line.

According to the present invention, as can be understood from the above description and FIG. 2, the event signal (trigger event signal) for the starting of state information acquisition is generated 'for each scanning line', but the actual Z-phase pulse signal is generated only once per two scanning lines. This is to ensure certainty of the state information acquisition for each scanning line. That is, since the actual Z-phase pulse signal is generated only once per two scanning lines in terms of a characteristic of motion by the slider-crank mechanism, as described above, there is a possibility that the actual Z-phase pulse signal becomes unstable, and thus, it may become unclear which scanning line the acquired state information corresponds to. Accordingly, in order to prevent the unclearness, a trigger event signal for "starting of state information acquisition" is generated for each scanning line, in the present invention.

The method of generating the above-described event signals will be described with reference to a specific preferred example.

As mentioned above, the trigger controller 50 generates a trigger signal on the basis of rotational motion information of the rotary encoder that detects the rotational motion of the drive motor and linear motion information of the linear encoder that detects the linear motion of the probe. Here, interpretation of the two types motion information is performed on the basis of the number of A-phase pulse signals. This is because the number of pulse signals reflects the two types of motion information.

That is, the trigger controller 50 detects the generation of the Z-phase pulse signal, and starts counting the number of the A-phase pulse signals of the rotary encoder (Counting start). Here, the number of B-phase pulse signals of the rotary encoder may be counted, instead of the number of A-phase pulse signals, because the two signals are the same only with a phase difference of 90 degrees from each other.

In a case where the number of A-phase or B-phase pulse signals reaches a preset value (Counting Num: Z1), the trigger controller 50 generates a first trigger event signal, and in a case where the number of A-phase or B-phase pulse signals reaches a preset value (Counting Num: Z2), the trigger controller 50 generates a second trigger event signal.

Here, a relationship of Z1<Z2 is established, and the preset values are preferably set in the following manner in consideration of the size of the object, the appearance of the object, and the size of a portion of the object where the acquisition of state information is necessary.

In the present invention, the scanning of the object is not performed over the entire region (AR) in which a scanner (the probe in the present invention) of a scanning device (not shown in the drawings) can be positioned, but is performed over a partial region (PR) in which the acquisition of the state information of the object is necessary, thereby preventing unnecessary data that may be generated in the process of acquiring the state information. To this end, in the present invention, prior to the scanning and the acquisition of the state information on the object, the size of the region (PR) in which the acquisition of the state information is necessary from a captured image is determined after imaging of the object is performed, and the acquisition of the state information (the scanning of the object) is performed only for the region (PR) corresponding to the size.

The imaging of the object is performed by an object imaging section 90, and the object imaging section 90 may be embodied by an optical camera, for example. The imaging may be performed according to a so-called 'principle of photographic composition', and the point of the principle is to perform imaging so that an object of interest is located in a central portion of a captured image in consideration of the fact that the object of interest of the imaging is located in the central portion of the image as much as possible.

The object imaging section 90 may be located, for example, above a central point of the entire region (AR) in which the scanner (probe) of the scanning device can be located, in the vertical direction (Z-direction). Further, since the present invention is applied to a case where a visual inspection of an object is performed, it is necessary to clearly distinguish the object from other portions (background) other than the object. Accordingly, in many cases, the color of the background may be set as a single color with a clear difference in brightness or saturation. Therefore, it is preferable to perform imaging in the background as mentioned above to clearly distinguish the object from the background, and the size of the region (PR) in which the acquisition of the state information is necessary covers an object portion of the captured image.

A region demarcating section 80 demarcates the PR by extracting position values corresponding to a starting point and an end point of the region (PR) in which state information is acquired from an image of the object captured by the object imaging section 90. Here, the position values may be, for example, coordinate values in the XY-plane having the above-mentioned central point as the origin, and the coordinate values may be X-directional distances and Y-directional distances from the origin (starting point) of the entire region (AR) in which the scanner (probe) can be located.

Here, Z1 and Z2 may be set on the basis of the position values, and a specific example thereof will be described with reference to FIG. 2.

In a case where distances (d1, d2) from an edge in the Y-direction of the entire region (AR) in which the scanner (probe) of the scanning device can be located to edges in the Y-direction in the region (PR in which the state information is acquired) determined by the position values extracted by the region demarcating section 80 are 9 [cm] and 29 [cm], respectively, and the wavelength per cycle of the A-phase pulse signal is 8 [mm], Z1 should be set as 11. This is because the first trigger event signal should be generated the same as or slightly earlier than the starting point of the region (PR) in which the state information is acquired. Accordingly, in this example, since 8 [mm]×11=8.8 [cm]~8 [mm]×12=9.6 [cm], Z1 should be 11.

Then, the probe 10 moves in the Y-direction to obtain state information on the next scanning line ((N+1)-th scanning line). The degree of movement in the Y-direction may be determined according to various circumstances, and in order to increase the Y-directional resolution of an image to be generated later, it is preferable to set the degree of movement as short as possible. In a case where a high-resolution image is desired, with reference to the above example, Z2 is set to about 38 to 39 (since d2=29 [cm], 8 [mm]×37=29.6 [cm]~8 [mm]×39=31.2 [cm]). This is also the same as the above-mentioned reason (method) in which Z1 is set, and Z2 may be determined as a different value from the above example according to how much Y-direction resolution is to be set.

In a case where a Z-phase pulse signal for scanning (N+2)-th and (N+3)-th scanning lines is generated after the scanning of the (N+1)-th scanning line is finished, the trigger controller 50 resets the number of A-pulse signals counted in the scanning process of the N-th and (N+1)-th scanning lines to 0 (Counting reset). This means that the calculated values of the rotation angle ($\varphi$) and the linear motion position (x) as described above are also initialized. Accordingly, by clarifying that the scanning of the N-th and (N+1)-th scanning lines has ended, it is possible to enhance the accuracy of image information to be generated as described hereinafter. With respect to the (N+2)-th scanning line and thereafter, by repeating the above processes for the N-th and (N+1)-th scanning lines, the state information of the object is acquired and its image information is generated.

The ultrasonic wave irradiating/receiving section 20 performs irradiation of an ultrasonic wave to the object through the probe 10 using the trigger signal generated by the trigger controller 50 according to the above mentioned method as a synchronization signal, and receives an echo signal of the irradiated ultrasonic wave through the probe 10.

A converting section 30 receives the echo signal from the ultrasonic wave irradiating/receiving section 20, and converts the received echo signal into a digital image signal, and a main controller 40 receives the digital image signal, and generates ultrasonic image information on the object. Since the echo signal includes state information of the object, as a result, the state information of the object is generated as ultrasonic image information. Since various methods for implementing the ultrasonic image information are already known in various documents including patent documents or are implemented industrially, detailed description thereof will not be performed herein. The main controller 40 generates the ultrasonic image information using the known or implemented methods.

The generation of ultrasonic image information according to the present invention will be generally described as follows.

Using a trigger signal generated by the trigger controller 50 as a synchronization signal, ultrasonic waves are irradiated to the object through the ultrasonic wave irradiating/receiving section 20 and the probe 10, and the probe 10 receives an ultrasonic echo signal reflected from the object and transmits state information (ultrasonic echo signal) of the object to the ultrasonic wave irradiating/receiving section 20. Here, the received ultrasonic echo signal is stored in correspondence to each trigger signal at a position of the probe 10 calculated at the time when the trigger signal is generated.

The main controller 40 combines the position of the ultrasonic probe 10 corresponding to each trigger signal and its echo signal (specifically, a digital image signal output from the converting section 30) at the position to generate entire scan image information (ultrasonic image information). The generated ultrasonic image information may be a two-dimensional or three-dimensional image, which may be selected according to a field to which the present invention is applied or characteristics of inspection of the object.

The ultrasonic wave irradiating/receiving section 20 performs irradiation of ultrasonic waves using the trigger signal generated by the trigger controller 50 as a synchronization signal, and receives the ultrasonic echo signal, and generates ultrasonic image information at set intervals only in the preset area (PR). Thus, it is possible to quickly perform input of ultrasonic images while minimizing the load.

The method of the present invention may be realized by computer-readable codes on a computer-readable recording medium. The computer-readable recording medium includes all kinds of recording devices in which data readable by a computer system is stored. Examples of the computer-readable recording media include a ROM, a RAM, a CD-ROM, a DVD-ROM, a magnetic tape, a floppy disk, an optical data storage device, or the like. Further, the examples include a device realized in the form of carrier waves (for example, transmission through a wired/wireless network). In addition, the computer-readable recording medium may be distributed in network-connected computer systems, computer-readable codes may be stored therein in a distributed manner for execution.

As described above, the technical concept of the present invention has been proposed through the disclosure of preferred embodiments of the present invention that guarantee the specificity of the concept. Those of ordinary skill in the art to which the present invention pertains will understand that the preferred embodiments may be modified in various forms without departing from the technical spirit (essential characteristics) of the present invention. Accordingly, the disclosed embodiments should be considered from an illustrative point of view rather than a limiting point of view, and the scope of the present invention should be construed to include not only the matters disclosed in the claims, but also all equivalents thereof.

What is claimed is:

1. An apparatus for generating ultrasonic scan image information, by converting a one-directional rotational motion of a drive motor into a linear reciprocating motion of an ultrasonic probe connected to the drive motor, and generating an image of an object by scanning the object in two dimensions by the linear motion of the ultrasonic probe and a vertical motion perpendicular to the linear motion, comprising:

an ultrasonic wave irradiating/receiving section that performs irradiation of an ultrasonic wave to the object through the ultrasonic probe and receives an echo signal of the irradiated ultrasonic wave through the ultrasonic probe;

a signal converting section that receives the echo signal and converts the received echo signal into a digital image signal;

a main controller that receives the digital image signal and generates ultrasonic image information on the object; and a trigger controller that generates a trigger signal on the basis of motion information of the ultrasonic probe, wherein the ultrasonic image information is generated in synchronization with the trigger signal, wherein the motion information of the ultrasonic probe includes rotational motion information of a rotary encoder that detects the rotational motion of the drive motor and linear motion information of a linear encoder that detects the linear motion of the ultrasonic probe, the rotary encoder is an incremental rotary encoder that outputs an A-phase signal, a B-phase signal, and a Z-phase signal in the form of pulses, respectively, and the linear encoder outputs a linear pulse signal at regular intervals in the form of pulses according to a position on a linear motion trajectory of the ultrasonic probe, wherein the one-directional rotational motion of the drive motor is started, a first trigger event signal is generated after generation of the Z-phase signal of the rotary encoder, and in a case where the first trigger event signal is generated, the trigger signal is generated in the form of pulses up to a preset position of the ultrasonic probe using the pulse signal of the linear encoder as a synchronization signal.

2. The apparatus for generating ultrasonic scan image information according to claim 1, wherein a position of the ultrasonic probe is calculated when each trigger signal is generated, and the echo signal at the calculated position is stored in correspondence to each trigger signal.

3. The apparatus for generating ultrasonic scan image information according to claim 1, wherein the trigger signal is generated on the basis of rotational position information based on the A-phase signal of the incremental rotary encoder that detects the rotational motion of the drive motor, the linear motion position of the ultrasonic probe when each trigger signal is generated is calculated, and the echo signal at the calculated linear motion position is stored in correspondence to each trigger signal.

4. The apparatus for generating ultrasonic scan image information according to claim 3, wherein the rotational position information is calculated as a rotation angle ($\varphi$) according to the number of pulses of the A-phase signal based on the Z-phase signal of the rotary encoder, and the linear motion position (x) of the ultrasonic probe is calculated by the following equation, $$x = R * \cos(\phi) + L * \left[ 1 - \frac{(R/L)^2}{4} + \frac{(R/L)^2}{4} * \cos(2\phi) \right] - R$$

where R is a length of a crank shaft connected to the motor, and L is a length of a connecting rod connecting the crank shaft and the ultrasonic probe.

5. The apparatus for generating ultrasonic scan image information according to claim 1, wherein the trigger signal is generated on the basis of a linear motion position of the ultrasonic probe calculated by a pulse signal generated by the linear encoder that detects the linear motion of the ultrasonic probe, and the echo signal at the linear motion position of the ultrasonic probe is stored in correspondence to each trigger signal.

6. The apparatus for generating ultrasonic scan image information according to claim 1, wherein the first trigger event signal is generated after the A-phase signal of a preset number of pulses (Z1) is input after the Z-phase signal of the rotary encoder is input.

7. The apparatus for generating ultrasonic scan image information according to claim 1, wherein the trigger signal is generated at an interval of an integer multiple of an interval of the pulse signal of the linear encoder.

8. The apparatus vice for generating ultrasonic scan image information according to claim 1, wherein the trigger controller generates a second trigger event signal in correspondence to a preset position of the ultrasonic probe after the generation of the trigger signal is stopped, and in a case where the second trigger event signal is generated, the trigger signal is generated in the form of pulses up to the preset position of the ultrasonic probe using the pulse signal of the linear encoder as a synchronization signal.

9. The apparatus for generating ultrasonic scan image information according to claim 8, wherein the second trigger event signal is generated after the A-phase signal of a preset number of pulses (Z2) is input after the Z-phase signal of the rotary encoder is input.

10. The apparatus for generating ultrasonic scan image information according to claim 1, further comprising:

an object imaging section that images the object; and a region demarcating section that extracts position values corresponding to a starting point and an end point of a region where state information of the object is acquired from an image of the object to demarcate a region where the state information is acquired.

11. A method for generating ultrasonic image information on an object by scanning of the object in two dimensions by a linear motion of an ultrasonic probe and a vertical motion perpendicular to the linear motion, comprising:

generating a trigger signal for the irradiation of the ultrasonic wave on the basis of the motion information of the ultrasonic probe;

performing irradiation of an ultrasonic wave to the object through the ultrasonic probe and receiving an echo signal of the irradiated ultrasonic wave through the ultrasonic probe;

converting the echo signal into a digital image signal; and generating ultrasonic image information on the object from the digital image signal, wherein the irradiation of the ultrasonic wave is performed using the trigger signal as a synchronization signal, wherein the motion information of the ultrasonic probe includes rotational motion information of a rotary encoder that detects the rotational motion of the drive motor and linear motion information of a linear encoder that detects the linear motion of the ultrasonic probe, the rotary encoder is an incremental rotary encoder that outputs an A-phase signal, a B-phase signal, and a Z-phase signal in the form of pulses, respectively, and the linear encoder outputs a linear pulse signal at regular intervals in the form of pulses according to a position on a linear motion trajectory of the ultrasonic probe, wherein the one-directional rotational motion of the drive motor is started, a first trigger event signal is generated after generation of the Z-phase signal of the rotary encoder, and in a case where the first trigger event signal is generated, the trigger signal is generated in the form of pulses up to a preset position of the ultrasonic probe using the pulse signal of the linear encoder as a synchronization signal.

12. The method for generating ultrasonic image information according to claim 11, wherein the trigger signal is generated in correspondence to the motion information of the ultrasonic probe, a position of the ultrasonic probe is calculated when each trigger signal is generated, and the echo signal at the calculated position is stored in correspondence to each trigger signal.

13. The method for generating ultrasonic image information according to claim 11, wherein the trigger signal is generated in correspondence to rotational position information based on the A-phase signal of the incremental rotary encoder that detects the rotational motion of a drive motor, the linear motion position of the ultrasonic probe when each trigger signal is generated is calculated, and the echo signal at the calculated linear motion position is stored in correspondence to each trigger signal.

14. The method for generating ultrasonic image information according to claim 11, wherein the trigger signal is generated on the basis of a linear motion position of the ultrasonic probe calculated by a pulse signal generated by the linear encoder that detects the linear motion of the ultrasonic probe, and the echo signal at the linear motion position of the ultrasonic probe is stored in correspondence to each trigger signal.

15. The method for generating ultrasonic image information according to claim 11, wherein a second trigger event signal is generated in correspondence to a preset position of the ultrasonic probe after the generation of the trigger signal is stopped, and in a case where the second trigger event signal is generated, the trigger signal is generated in the form of pulses up to the preset position of the ultrasonic probe using the pulse signal of the linear encoder as a synchronization signal.

* * * * *